(12) United States Patent
Jiang et al.

(10) Patent No.: US 12,179,601 B2
(45) Date of Patent: Dec. 31, 2024

(54) INERTANCE-INTEGRATED DAMPING SYSTEM FOR WHEEL ASSEMBLY BUSHINGS

(71) Applicant: DRiV Automotive Inc., Southfield, MI (US)

(72) Inventors: Zheng Jiang, Bristol (GB); Nicholas Joseph Wills, Bristol (GB); Yi-Yuan Li, Bristol (GB); Miguel Dhaens, Lommel (BE); Simon Andrew Neild, Bristol (GB); Thomas Lewis Hill, Bristol (GB)

(73) Assignee: DRiV Automotive Inc., Northville, MI (US)

( * ) Notice: Subject to any disclaimer, the term of this patent is extended or adjusted under 35 U.S.C. 154(b) by 433 days.

(21) Appl. No.: 17/590,308

(22) Filed: Feb. 1, 2022

(65) Prior Publication Data

US 2023/0241961 A1 Aug. 3, 2023

(51) Int. Cl.
*B60K 7/00* (2006.01)
*B60B 27/00* (2006.01)
(Continued)

(52) U.S. Cl.
CPC ........ *B60K 7/0007* (2013.01); *B60B 27/0015* (2013.01); *B60B 27/0052* (2013.01);
(Continued)

(58) Field of Classification Search
CPC ............ B60B 27/0015; B60B 27/0063; F16C 17/102; F16C 2326/02; H02K 7/006; H02K 7/102; B60K 2007/0038; B60K 2007/0092

See application file for complete search history.

(56) References Cited

U.S. PATENT DOCUMENTS

| 4,822,010 A | 4/1989 | Thorn |
| 4,899,997 A | 2/1990 | Thorn |

(Continued)

FOREIGN PATENT DOCUMENTS

| CN | 102673380 A | 9/2012 |
| CN | 105605133 A | 5/2016 |

(Continued)

OTHER PUBLICATIONS

Extended European Search Report regarding Patent Application No. 231517830, dated Jun. 27, 2023.

*Primary Examiner* — Erez Gurari
(74) *Attorney, Agent, or Firm* — Harness, Dickey & Pierce, P.L.C.

(57) ABSTRACT

A wheel assembly bushing for in-wheel electric motors where the bushing includes a hydraulic chamber positioned within a resilient sleeve of the bushing and a helical fluid channel that extends helically about an inner bushing member between first and second fluid channel ends, which are arranged in fluid communication with the hydraulic chamber. An outer body extends annularly about the resilient sleeve, which permits relative movement between the inner bushing member and the outer body. The fluid channel is configured to produce inertance. This inertance, when combined with other damping and stiffness effects of the wheel assembly bushing, provides phase and magnitude shifts between force and velocity, which ultimately reduce magnetic gap deformation in the in-wheel electric motor.

16 Claims, 5 Drawing Sheets

(51) Int. Cl.
*F16C 17/10* (2006.01)
*H02K 7/00* (2006.01)
*H02K 7/102* (2006.01)

(52) U.S. Cl.
CPC ........ *B60B 27/0063* (2013.01); *F16C 17/102* (2013.01); *H02K 7/006* (2013.01); *H02K 7/102* (2013.01); *B60K 2007/0038* (2013.01); *B60K 2007/0092* (2013.01); *F16C 2326/02* (2013.01)

(56) References Cited

U.S. PATENT DOCUMENTS

| | | | |
|---|---|---|---|
| 5,954,317 A | | 9/1999 | Meyer et al. |
| 10,086,645 B2 | | 10/2018 | Liu et al. |
| 2012/0090912 A1 | | 4/2012 | Gannon et al. |
| 2018/0296906 A1* | | 10/2018 | Quick ................. B60B 27/0015 |
| 2022/0379676 A1* | | 12/2022 | Joo ........................ B60G 7/008 |

FOREIGN PATENT DOCUMENTS

| DE | 3631620 A1 | 3/1987 |
|---|---|---|
| EP | 3478987 B1 | 4/2020 |
| GB | 2453783 A | 4/2009 |

\* cited by examiner

INERTANCE-INTEGRATED DAMPING SYSTEM FOR WHEEL ASSEMBLY BUSHINGS

FIELD

The present disclosure generally relates to bushings used in vehicles. More particularly, the present disclosure relates to inertance-integrated damping systems incorporated into bushings used in vehicle wheel assemblies and in-wheel electric motors.

BACKGROUND

This section provides background information related to the present disclosure which is not necessarily prior art.

In-wheel electric motors are gaining popularity as both primary and secondary propulsion solutions for plug-in-hybrid vehicles (PHEVs) and electric vehicles (EVs). In-wheel electric motors mount inside the wheels of a vehicle and therefore permit better torque vectoring capabilities and offer packaging advantages because they do not take up additional space inside the vehicle body and allow for the elimination of traditional driveshafts.

An important factor when designing an in-wheel motor is magnetic gap deformation. Magnetic gap deformation is the relative displacement between the rotor and stator of the electric motor. High magnetic gap deformation worsens the high frequency vibrations experienced in the vehicle and can also be detrimental to the longevity and reliability of the in-wheel electric motor. It is therefore imperative to limit this magnetic gap deformation. When magnetic gap deformation is high, design tolerances require a larger gap between the rotor and the stator, which also decreases the efficiency of the in-wheel electric motor. In other words, in-wheel electric motors are most efficient when the gap between the rotor and stator is small, but magnetic gap deformation places design limits on the size of this gap, therefore necessitating the use of larger, less efficient electric motors. In addition to reduced efficiency, another drawback is that larger, less efficient in-wheel electric motors increase the unsprung mass of the vehicle because the electric motors are located inside the wheels. This can also worsen ride comfort and tire grip. As a result, there is a need for solutions that limit the negative effects magnetic gap deformation can have on vehicles that are equipped with in-wheel electric motors.

SUMMARY

This section provides a general summary of the disclosure and is not a comprehensive disclosure of its full scope or all of its features. In particular, the description of the physical embodiments of the design are not intended to limit this disclosure to only the specific arrangements and design features of the particular examples shown and described herein.

In accordance with one aspect of the present disclosure, a wheel assembly is provided, which includes a wheel hub, a wheel rotatably mounted on the wheel hub, an in-wheel electric motor, and at least one wheel assembly bushing. The in-wheel electric motor includes a stator that is mounted on the wheel hub and a rotor that is coupled to the wheel. As such, the rotor and wheel rotate together relative to the stator and wheel hub. The wheel assembly bushing(s) include(s) an inner bushing member, an outer body, and a resilient sleeve. The outer body of the wheel assembly bushing(s) is concentrically arranged about and radially spaced from the inner bushing member and the resilient sleeve is positioned radially between the inner bushing member and the outer body.

The wheel assembly bushing(s) also include(s) a hydraulic chamber positioned within the resilient sleeve and a fluid channel that extends between first and second fluid channel ends, which are arranged in fluid communication with the hydraulic chamber. The resilient sleeve is made of a resilient material such that the resilient sleeve is configured to permit relative movement between the inner bushing member and the outer body. The fluid channel is configured to produce a phase delay between input forces that cause relative movement between the inner bushing member and the outer body and reaction forces that are produced by pressure pulses in the hydraulic chamber resulting from fluid flow through the fluid channel. The principle behind this phase delay between the input and reaction forces is known as inertance.

In accordance with another aspect of the present disclosure, a wheel assembly bushing is provided that includes an inner bushing member, an outer body, and a resilient sleeve. The inner bushing member of the wheel assembly bushing extends axially along a longitudinal axis. The resilient sleeve of the wheel assembly bushing extends annularly about the inner bushing and is made of a resilient material. The outer body of the wheel assembly bushing is concentrically arranged about and is radially spaced from the inner bushing member. The outer body of the wheel assembly bushing extends annularly about the resilient sleeve such that the resilient sleeve is positioned radially between the inner bushing member and the outer body.

A hydraulic chamber is positioned within the resilient sleeve. The hydraulic chamber extends annularly within the resilient sleeve and axially between a first hydraulic chamber end and a second hydraulic chamber end. A helical fluid channel extends helically about the inner bushing member between a first fluid channel end and a second fluid channel end. The wheel assembly bushing(s) also include(s) a divider body, within the resilient sleeve, that extends into the hydraulic chamber at a location that is positioned longitudinally between the first and second hydraulic chamber ends. The divider body divides the hydraulic chamber into first and second hydraulic chamber segments. The first fluid channel end of the helical fluid channel is arranged in fluid communication with the first hydraulic chamber segment and the second fluid channel end of the helical fluid channel is arranged in fluid communication with the second hydraulic chamber segment. In addition, a fluid passageway is provided in the resilient sleeve and/or the divider body, which permits fluid flow around or through the divider body such that fluid can pass between the first and second hydraulic chamber segments.

With typical in-wheel electric motors, the rotor is fixed to the wheel of the vehicle and the stator is fixed to the wheel hub mass. Such an arrangement does not allow the magnetic gap deformation to be adjusted independently. In order to reduce the ill-effects of magnetic gap deformation and improve the efficiency of in-wheel electric motors, the rotor and stator are isolated from the wheel and wheel hub using the wheel assembly bushings described herein. This effectively reduces magnetic gap deformation in the in-wheel electric motor without degrading ride comfort (often termed body vertical acceleration) and tire grip (often termed tire dynamic load).

Advantageously, the phase delay/inertance created by the fluid channel in the wheel assembly bushings described herein produces reaction forces proportional to the relative acceleration of fluid between the first and second fluid channel ends. Hence, these components of the wheel assembly bushings described herein act as a mechanical equivalent to an electrical capacitor, using the force-current relationship in an electrical capacitor as an analogy. The phase delay/inertance created by the fluid channel in the wheel assembly bushings (collectively forming a fluid-filled inertia track inside the wheel assembly bushing), combined with other damping and stiffness effects of the wheel assembly bushing, will provide phase and magnitude shifts between force and relative movement between the resilient sleeve and the outer body. Such effects significantly enhance the vibration suppression functionality of the wheel assembly bushings described herein.

BRIEF DESCRIPTION OF DRAWINGS

The drawings described herein are for illustrative purposes only of selected embodiments and not all possible implementations and are not intended to limit the scope of the present disclosure.

DETAILED DESCRIPTION

Figure 1:
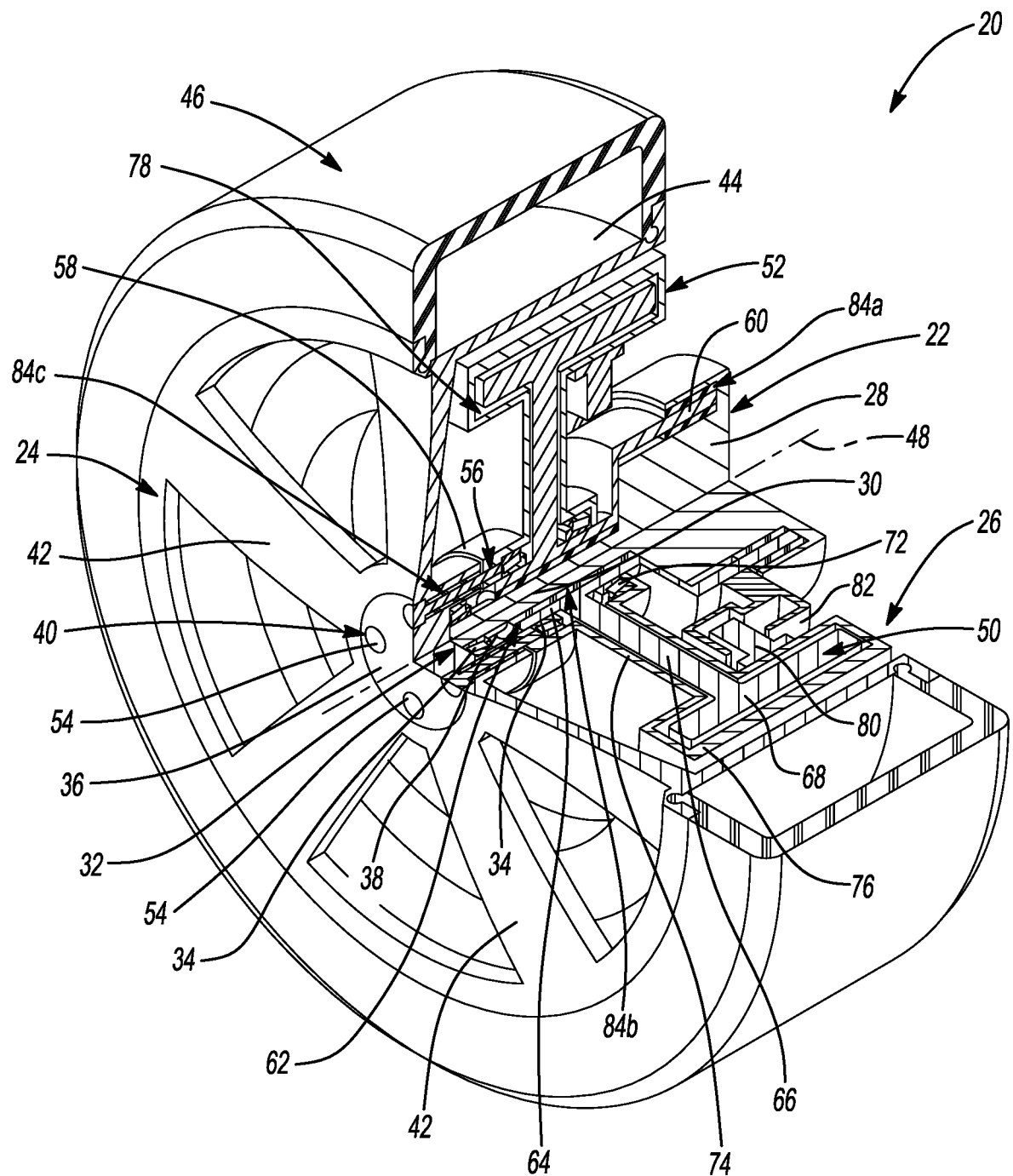
FIG. 1 is a perspective section view of an exemplary wheel assembly constructed in accordance with the present disclosure.

Example embodiments will now be described more fully with reference to the accompanying drawings. Wherever possible, the same reference numbers will be used throughout the drawings to refer to same or like parts.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
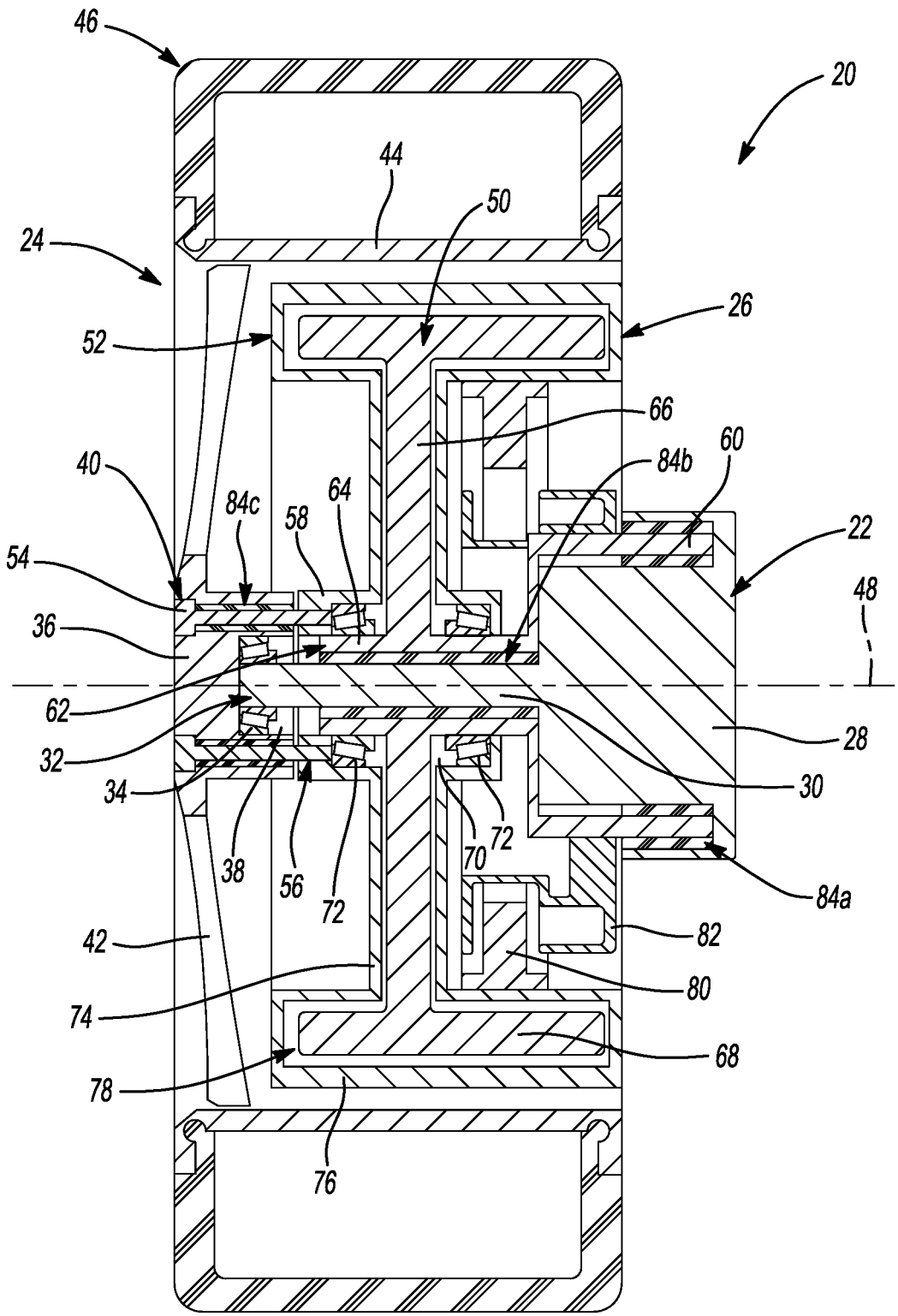
FIG. 2 is a front cross-sectional view of the exemplary wheel assembly shown in FIG. 1.

FIGS. 1 and 2 illustrate an exemplary wheel assembly 20 for a vehicle (not shown). The wheel assembly 20 includes a wheel hub 22, a wheel 24 that is rotatably mounted on the wheel hub 22, and an in-wheel electric motor 26. The wheel hub 22 includes a hub portion 28 and a shaft portion 30. The shaft portion 30 of the wheel hub 22 has a smaller diameter than the hub portion 28 of the wheel hub 22 and is positioned outboard of the hub portion 28, meaning that the shaft portion 30 of the wheel hub 22 is further from a centerline of the vehicle than the hub portion 28. The shaft portion 30 of the wheel hub 22 extends out from the hub portion 28 to an outboard end 32 and a wheel bearing 34 is positioned on the outboard end 32 of the shaft portion 30 of the wheel hub 22. The wheel 24 includes an attachment portion 36 that includes a central bore 38 and a plurality of bolt holes 40 that are circumferentially spaced about the central bore 38. The wheel 24 also includes spokes 42 that extend radially outward from the attachment portion 36 to an outer rim 44 that supports a tire 46. The wheel 24 is mounted over the wheel bearing 34 where the outboard end 32 of the shaft portion 30 of the wheel hub 22 and the wheel bearing 34 are received in the central bore 38 of the wheel 24. In this way, the wheel 24 is supported on and can rotate relative to the shaft portion 30 of the wheel hub 22 about an axis of rotation 48.

The in-wheel electric motor 26 includes a stator 50 that is mounted on the wheel hub 22 and a rotor 52 that is coupled to the wheel 24 by a plurality of wheel bolts 54 that extend through the bolt holes 40 in the wheel 24 and thread into threaded bores 56 in a base portion 58 of the rotor 52. In the illustrated example, the wheel 24 includes four bolt holes 40, which receive four wheel bolts 54. However, it should be appreciated that the number of wheel bolts 54 and bolt holes 40 may vary from vehicle to vehicle. Alternatively, the wheel 24 may be configured in a center-lock configuration where a single/central wheel bolt or fastener attaches the wheel 24 to the base portion 58 of the rotor 52. Regardless of the configuration, the rotor 52 and wheel 24 rotate together relative to the stator 50 and wheel hub 22. The stator 50 includes an inboard portion 60 and an outboard portion 62. The inboard portion 60 of the stator 50 extends annularly about and is supported on the hub portion 28 of the wheel hub 22, meanwhile the outboard portion 62 of the stator 50 extends annularly about and is support on the shaft portion 30 of the wheel hub 22. The outboard portion 62 of the stator 50 includes a cylindrical base 64 that extends annularly about the shaft portion 30 of the wheel hub 22, a disc portion 66 that extends radially outwardly from the cylindrical base 64 to an outer circumferential ring 68. The base portion 58 of the rotor 52 includes a central cavity 70 that houses a rotor bearing assembly 72. The rotor bearing assembly 72 extends annularly between the cylindrical base 64 of the stator 50 and the base portion 58 of the rotor 52. The rotor 52 includes a transverse body 74 that extends radially outwardly from the base portion 58 of the rotor 52 to a circumferential housing 76 that extends about and encloses the outer circumferential ring 68 of the stator 50. As such, a magnetic gap 78 is formed between the circumferential housing 76 of the rotor 52 and the outer circumferential ring 68 of the stator 50.

Optionally, the wheel assembly 20 further includes a brake disc 80 and a brake caliper 82. In the illustrated example, the brake caliper 82 is fixed to the inboard portion 60 of the stator 50 and the brake disc 80 is fixed to the rotor 52 and extends radially inwardly from the circumferential housing 76 such that the brake disc 80 and rotor 52 rotate together relative to the brake caliper 82. However, it should be appreciated that alternative configurations are possible. For example, the brake caliper 82 may alternatively be mounted to the hub portion 28 of the wheel hub 22.

The wheel assembly 20 illustrated in FIGS. 1 and 2 also includes a number of wheel assembly bushings 84a, 84b, 84c. In particular, the wheel assembly 20 includes a first wheel assembly bushing 84a that is positioned between the hub portion 28 of the wheel hub 22 and the inboard portion 60 of the stator 50. The wheel assembly 20 also includes a second wheel assembly bushing 84b that is positioned between the shaft portion 30 of the wheel hub 22 and the cylindrical base 64 of the outboard portion 62 of the stator 50. As a result, the first and second wheel assembly bushings 84a, 84b are positioned radially between the wheel hub 22 and the stator 50 at longitudinally spaced locations. Finally, the wheel assembly 20 includes one or more third wheel assembly bushings 84c that are positioned in the bolt holes 40 between the wheel bolts 54 and the wheel 24. While a total of four third wheel assembly bushings 84c are shown in the illustrated example, one for each wheel bolt 54, it should be appreciated that the wheel assembly 20 may include a different number of third wheel assembly bushings 84c. For example, a single third wheel assembly bushing 84c may be used for center lock wheel configurations.

Figure 3:
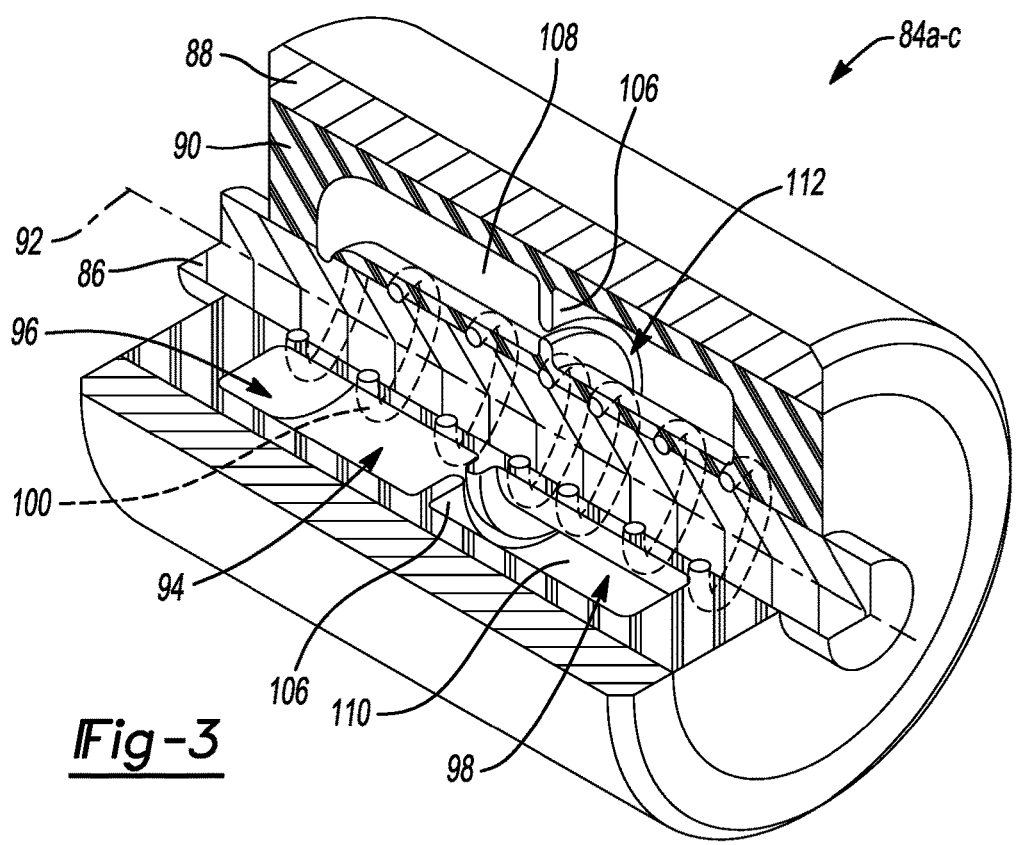
FIG. 3 is a perspective section view of an exemplary wheel assembly bushing constructed in accordance with the present disclosure.
Figure 4:
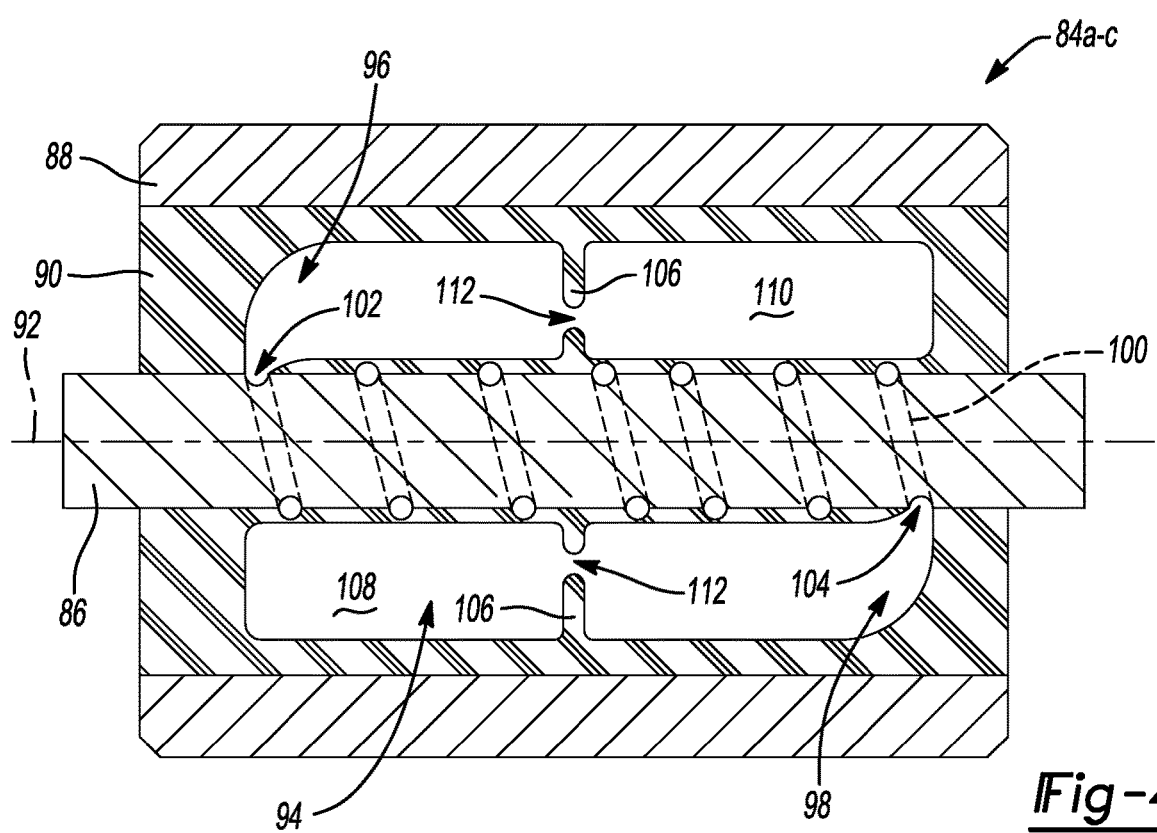
FIG. 4 is a side cross-sectional view of the exemplary wheel assembly bushing shown in FIG. 3.

With additional reference to FIGS. 3 and 4, each of the wheel assembly bushings 84a-c includes an inner bushing member 86, an outer body 88 that is concentrically arranged about and radially spaced from the inner bushing member 86, and a resilient sleeve 90 that is positioned radially between the inner bushing member 86 and the outer body 88. The inner bushing member 86 extends axially along a longitudinal axis 92 that is co-aligned with or parallel to the axis of rotation 48 of the wheel 24. The resilient sleeve 90 extends annularly about the inner bushing member 86 and the outer body 88 extends annularly about the resilient sleeve 90 such that the resilient sleeve 90 is positioned radially between the inner bushing member 86 and the outer body 88. The resilient sleeve 90 is made of a resilient material, such as rubber or another elastomeric material, for example, that is configured to permit relative movement between the inner bushing member 86 and the outer body 88 when input forces act on the inner bushing member 86 and/or the outer body 88 of the wheel assembly bushings 84a, 84b, 84c as the wheel 24 travels over bumps or potholes and/or during acceleration, braking, and cornering maneuvers.

A hydraulic chamber 94 is positioned within the resilient sleeve 90 of each wheel assembly bushing 84a-c. The hydraulic chamber 94 is filled with a fluid like oil or hydraulic fluid. The hydraulic chamber 94 extends annularly within the resilient sleeve 90 and axially between a first hydraulic chamber end 96 and a second hydraulic chamber end 98. Each of the wheel assembly bushings 84a-c also has a helical fluid channel 100 that extends helically (i.e., in a spiral) about the inner bushing member 86. In the illustrated example, the helical fluid channel 100 is formed by spiral grooves in both the inner bushing member 86 and the resilient sleeve 90; however, it should be appreciated that the helical fluid channel 100 may alternatively be formed in just the resilient sleeve 90 or just the inner bushing member 86. The helical fluid channel 100 has a first fluid channel end 102 that is open to and arranged in fluid communication with the first hydraulic chamber end 96 (i.e., the first fluid channel end 102 is provided as an opening in the first hydraulic chamber end 96) and a second fluid channel end 104 that is open to and arranged in fluid communication with the second hydraulic chamber end 98 (i.e., the second fluid channel end 104 is provided as an opening in the second hydraulic chamber end 98). A divider body 106, within the resilient sleeve 90, extends into the hydraulic chamber 94 at a location that is positioned longitudinally between the first and second hydraulic chamber ends 96, 98. For example, in the illustrated embodiment, the divider body 106 is an annular, radially extending wall that is integral with and made of the same material as the resilient sleeve 90. However, it should be appreciated that the divider body 106 could alternatively be a separate or molded-in component of the wheel assembly bushings 84a-c. Regardless of the configuration, the divider body 106 divides the hydraulic chamber 94 into two hydraulic chamber segments 108, 110 that are arranged in fluid communication with one another via a fluid passageway 112, which is designed to provide a restriction to the fluid flow and thus result in a resistance/damping coefficient.

The hydraulic chamber segments 108, 110 include a first hydraulic chamber segment 108 that is arranged in fluid communication with the first fluid channel end 102 and a second hydraulic chamber segment 110 that is arranged in fluid communication with the second fluid channel end 104. The fluid passageway 112 permits fluid flow between the first and second hydraulic chamber segments 108, 110 and is configured as an annular opening in the divider body 106 in the illustrated embodiment. However, it should be appreciated that other configurations are possible, and depending on the final identified network, the divider body 106 can be placed at other locations. For example, the fluid passageway 112 may be one or more holes or orifices in the divider body 106 or could alternatively be one or more fluid pathways provided in the resilient sleeve 90. Regardless of the configuration, the fluid passageway 112 forms a pinch point in the hydraulic chamber 94 that limits fluid flow between the first and second hydraulic chamber segments 108, 110 such that temporary pressure differentials between the first and second hydraulic chamber segments 108, 110 can be generated by fluid flow through the helical fluid channel 100 in response to deflection of the resilient sleeve 90 for a period of time until the total fluid flow through both the fluid passageway 112 and the helical fluid channel 100 can equalize the pressures in the first and second hydraulic chamber segments 108, 110. As will be explained in greater detail below, the fluid passageway 112 and the helical fluid channel 100 cooperate to produce phase and magnitude shifts between the input forces causing relative movement between the inner bushing member 86 and the outer body 88 and deflection of the resilient sleeve 90. This relative movement within the wheel assembly bushings 84a, 84b, 84c generates reaction forces that are caused by pressure pulses in the hydraulic chamber 94 resulting from fluid flow through the fluid passageway 112 and helical fluid channel 100 from one end of the hydraulic chamber 94 to the other.

With reference to FIGS. 1-4, it should be appreciated that the inner bushing member 86 and outer body 88 of the various wheel assembly bushings 84a, 84b, 84c can have different configurations and may be separate components or integrated into the components of the wheel assembly 20 described above. For example, the inner bushing member 86 of the first wheel assembly bushing 84a may be a cylindrical sleeve that extends annularly about and abuts the hub portion 28 of the wheel hub 22 while the outer body 88 of the first wheel assembly bushing 84a may be a cylindrical sleeve that is received within and abuts the inboard portion 60 of the stator 50. Alternatively, the inner bushing member 86 of the first wheel assembly bushing 84a may be integral with the hub portion 28 of the wheel hub 22 and/or the outer body 88 of the first wheel assembly bushing 84a may be integral with the inboard portion 60 of the stator 50. Regardless of the configuration, the resilient sleeve 90 of the first wheel assembly bushing 84a is positioned radially between the hub portion 28 of the wheel hub 22 and the inboard portion 60 of the stator 50.

For the second wheel assembly bushing 84b, the inner bushing member 86 may be a cylindrical sleeve that extends annularly about and abuts the shaft portion 30 of the wheel hub 22 while the outer body 88 of the second wheel assembly bushing 84b may be a cylindrical sleeve that is received within and abuts the outboard portion 62 of the stator 50. Alternatively, the inner bushing member 86 of the second wheel assembly bushing 84b may be integral with the shaft portion 30 of the wheel hub 22 and/or the outer body 88 of the second wheel assembly bushing 84b may be integral with the outboard portion 62 of the stator 50. Regardless of the configuration, the resilient sleeve 90 of the second wheel assembly bushing 84b is positioned radially between the shaft portion 30 of the wheel hub 22 and the outboard portion 62 of the stator 50.

The outer body 88 of the third wheel assembly bushings 84c may be provided in the form of cylindrical sleeves that are received within the bolt holes 40 in the wheel 24 while the inner bushing members 86 may be cylindrical sleeves in the third wheel assembly bushings 84c that receive the wheel bolts 54. Alternatively, the inner bushing member 86 of the third wheel assembly bushings 84c may be integral with the wheel bolts 54 and/or the outer body 88 of the third wheel assembly bushings 84c may be integral with the wheel 24. Regardless of the configuration, the resilient sleeve 90 of the third wheel assembly bushings 84c are positioned between the wheel bolts 54 and the wheel 24.

Figure 5:
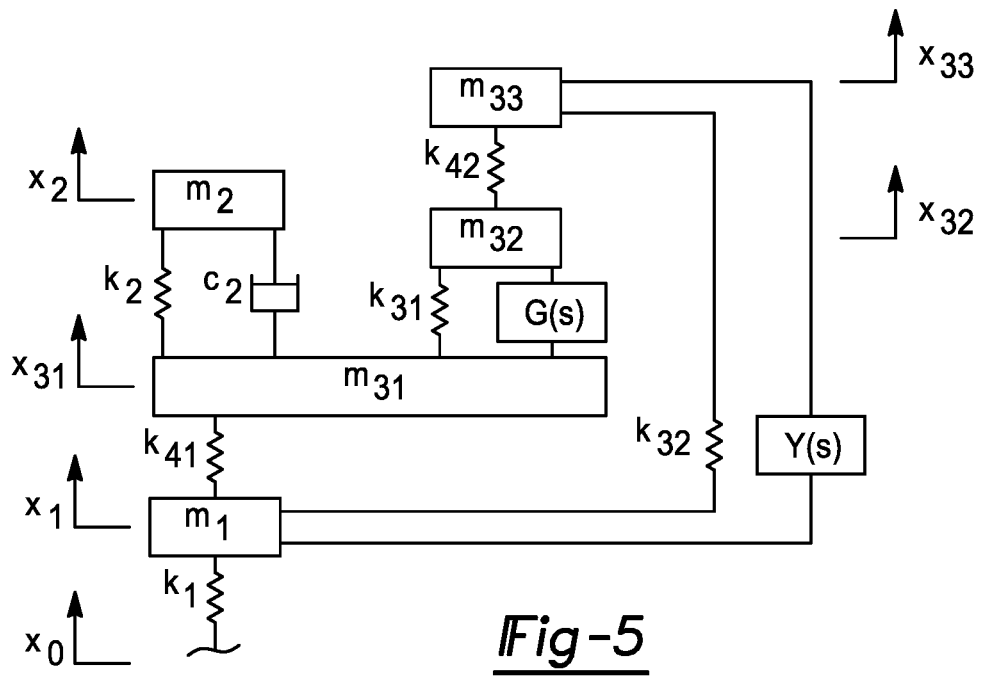
FIG. 5 is a schematic diagram of the exemplary wheel assembly shown in FIG. 1.
Figure 6:
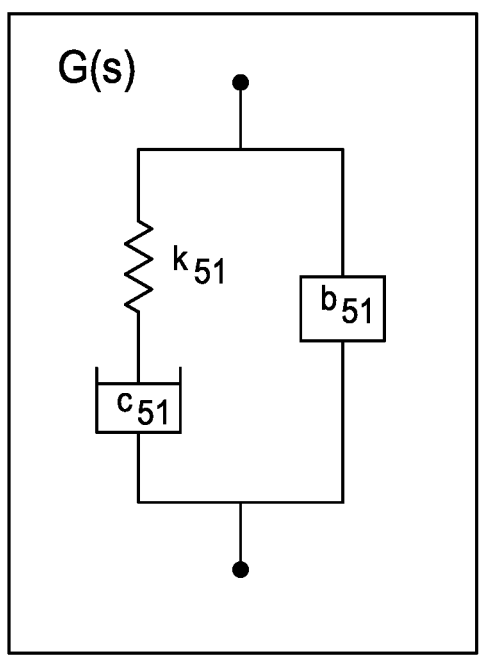
FIG. 6 is a network representation of an exemplary wheel assembly bushing that is positioned between the wheel hub and stator of the exemplary wheel assembly shown in FIG. 5.
Figure 7:
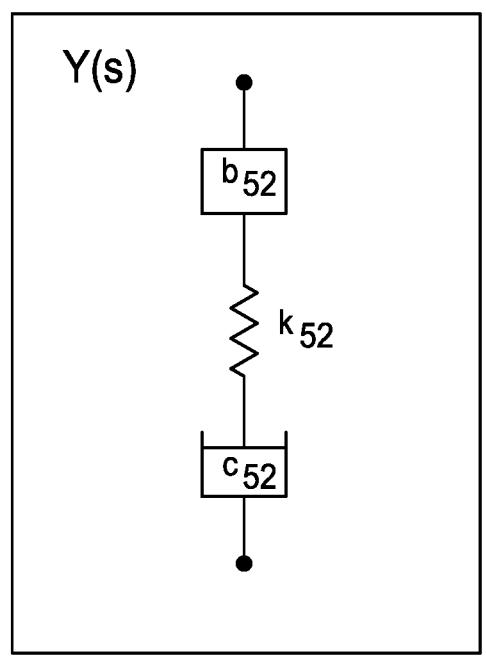
FIG. 7 is a network representation of another exemplary wheel assembly bushing that is positioned between the wheel and rotor of the exemplary wheel assembly shown in FIG. 5.

FIGS. 5-7 illustrate how the wheel assembly 20 described above may be modeled as a spring-mass system. The first and second wheel assembly bushings 84a, 84b combine to create a bushing interface between the stator 50 of the in-wheel electric motor 26 and the wheel hub 22, while the third wheel assembly bushings 84c provide a bushing interface between the rotor 52 of the in-wheel electric motor 26 and the wheel 24. It is important to note that the third wheel assembly bushings 84c may represent multiple bushings around the wheel 24. The $x_0$ parameter represents the location of the road surface, the $x_1$ parameter represents the displacement of the wheel 24, and the $x_2$ parameter represents the displacement of the vehicle body. The parameter labeled $x_{31}$ represents the displacement of the wheel hub 22, the $x_{32}$ parameter represents the displacement of the stator 50, and the $x_{33}$ parameter represents displacement of the rotor 52. The mass of the wheel 24 is represented by the $m_1$ parameter, the sprung mass of the vehicle is represented by the $m_2$ parameter, the mass of the wheel hub 22 is represented by the $m_{31}$ parameter, the mass of the stator 50 is represented by the $m_{32}$ parameter, and the mass of the rotor 52 is represented by the $m_{33}$ parameter. The tire 46 itself acts as a spring and has a stiffness represented by the $k_1$ parameter, while the stiffness of the vehicle's suspension struts (e.g., coil-over springs) is represented by parameter $k_2$. The damping coefficient of the vehicle's dampers are illustrated by parameter $c_2$. The spring-mass sub-system labeled G(s) illustrates the combination of the first and second wheel assembly bushings 84a, 84b, while the spring-mass sub-system Y(s) illustrates the third wheel assembly bushings 84c. The combined static stiffness of the resilient sleeves 90 in both the first and second wheel assembly bushings 84a, 84b is represented by parameter $k_{31}$. The combined static stiffness of the resilient sleeves 90 in the third wheel assembly bushings 84c is represented by parameter $k_{32}$. The wheel bearing 34 and the rotor bearing assembly 72 also have spring constants, which are represented by parameters $k_{41}$ and $k_{42}$, respectively.

The spring-mass sub-system G(s) shown in FIG. 6, which models the combination of the first and second wheel assembly bushings 84a, 84b, has a stiffness $k_{51}$, damping coefficient $c_{51}$, and inertance $b_{51}$. Similarly, the spring-mass sub-system Y(s) shown in FIG. 7, which models the third wheel assembly bushings 84c, also has a stiffness $k_{52}$, damping coefficient $c_{52}$, and inertance $b_{52}$. The values for these design parameters of spring-mass sub-systems G(s) and Y(s) can be determined using the optimization procedure describe below.

First, benchmark performance values for rubber bushings are calculated using the following equations:

$$J_1 = 2\pi(Vk)^{1/2}\|sT_{X_0 \to X_2}\|_2$$

$$J_3 = 2\pi(Vk)^{1/2}\left\|\frac{1}{s}T_{X_0 \to k_1(X_1 - X_0)}\right\|_2$$

$$J_M = 2\pi(Vk)^{1/2}\left\|\frac{1}{s}T_{X_0 \to (X_{33} - X_{32})}\right\|_2$$

In the above equations, $J_1$, $J_3$ and $J_M$ represent the $H_2$ norm of the vertical body acceleration, dynamic tire load, and magnetic gap deformation under the random road input in the Laplace domain. The V parameter is vehicle speed, k is a road roughness parameter, s is a Laplace operator, $\|-\|_2$ represents the $H_2$ norm, and $X_n$ is the Laplace transform of the mass displacements.

The spectral densities for the time varying displacement of the road surface traversed used in the above $J_1$, $J_3$ and $J_m$ relations can be described using the following equation:

$$s^{x_0}(f) = \frac{1}{V}S^{x'_0}(n)$$

In the equation above, f is frequency in Hz (cycles per second), V is the vehicle speed, n is the wave number in cycles per meter and f=nV. The parameters $s^{x_0}$ and $S^{x'_0}$ represent the spectral density of the time varying displacement of the road surface traversed, and the corresponding spectral density of the road's time varying velocity, respectively.

The parameter values that were used throughout these calculations are listed in Table 1, below:

TABLE 1

| Parameter Values | | | |
|---|---|---|---|
| Parameter | Value | Parameter | Value |
| $m_1$ | 60 kg | $k_1$ | 400 kN/m |
| $m_2$ | 420 kg | $k_2$ | 80 kN/m |
| $m_{32}$ | 20 kg | $k_{31}/k_{32}$ | 50 kN/m |
| $m_{32}$ | 30 kg | $k_{41}/k_{42}$ | 5 MN/m |
| $m_{33}$ | 20 kg | $c_2$ | 5000 Ns/m |
| V | 60 kph | $c_{31}/c_{32}$ | 200 Ns/m |
| k | 5e−7 m³/cycle | | |

When the above values are used, the benchmark performance values are:
$J_1$=1.4915 m/s²,
$J_3$=953.87 N,
$J_M$=7.4361 μm.

These calculated values are then used as constraints when the wheel assembly bushings 84a-c are optimized to reduce the magnetic gap deformation $J_M$ so as to ensure that the improvement in magnetic gap deformation $J_M$ does not degrade the vertical body acceleration $J_1$ and dynamic tire load $J_3$ performance.

When the benchmark rubber bushings are replaced with the wheel assembly bushings 84a-c described herein, eight different topological combinations including one spring element, one damper element, and one inertance element are provided. These eight different layouts represent all of the possible combinations of these three elements. Using the above optimization procedure, the inventors identified that the particular layout of the inertance-integrated wheel assembly bushings 84a-c illustrated in FIGS. 6-7 provide optimum performance values, where the values for vertical body acceleration $J_1$, dynamic tire load $J_3$, and magnetic gap deformation $J_M$ are as follows:
$J_1$=1.4915 m/s²,
$J_3$=953.87 N,
$J_M$=7.4361 μm.

In other words, using the network configurations illustrated in FIGS. 6-7, the magnetic gap deformation $J_M$ is reduced by 83.584% over a benchmark rubber bushing. At the same time, there is no degradation in the performance values for vertical body acceleration $J_1$ and dynamic tire load $J_3$ (in fact, the arrangement shown in FIGS. 6-7 provided a 2.0181% improvement for vertical body acceleration $J_1$).

Advantageously, by reducing the magnetic gap deformation $J_M$ without degrading the performance values for vertical body acceleration $J_1$ and dynamic tire load $J_3$, the wheel assembly bushings 84a-c described herein allow for the use of in-wheel electric motors 26 that have a smaller gap between the rotor 52 and the stator 50. Because in-wheel electric motors 26 are most efficient when the gap between the rotor 52 and stator 50 is small, the wheel assembly bushings 84a-c described herein allow for the use of smaller, more efficient in-wheel electric motors 26. Advantageously, these smaller, more efficient in-wheel electric motors 26 decrease the unsprung mass of the vehicle, which improves performance, ride comfort, and tire grip.

The wheel assembly 20 and wheel assembly bushings 84a-c illustrated in FIGS. 1-4 are physical examples of the topology shown in FIGS. 5-7 and integrate inertance into the wheel assembly bushings 84a-c using fluid filled inertiatracks provided by the hydraulic chamber 94 and helical fluid channel 100 to realize the inertance values b calculated above. In accordance with the wheel assembly bushings 84a-c design show in FIGS. 3 and 4, the relative motion between the outer body 88 and the inner bushing member 86 pushes fluid through the helical fluid channel 100. The length and area of the helical fluid channel 100 and the density of the fluid contribute to the inertance effect experienced. This inertance b can be calculated using the following equation:

$$b = lA_1^2 = \frac{l\rho}{A_2}A_1^2$$

In the equation above, $A_1$ is the area of the hydraulic chamber 94, $A_2$ is the area of the helical fluid channel 100, ρ is the density of fluid, and the l parameter is the un-coiled length of the helical fluid channel 100. By carefully designing the helical fluid channel 100 and selecting an appropriate fluid and resilient material for the resilient sleeve 90, the stiffness, damping, and inertance of the wheel assembly bushings 84a-c can be optimized according the calculations described above. Any physical realization will need to be constructed according to the parameter values obtained through the optimization process. These parameter values can be seen in Table 2 below:

TABLE 2

Parameter Values for Optimized Bushings

| Parameter | G(s) | Y(s) |
|---|---|---|
| Inertance (b, kg) | 2.9068 | 95.304 |
| Damping (c, Ns/m) | 2350.5 | 1347.3 |
| Stiffness (k, N/m) | 666810 | 367.450 |

The phase delay/inertance created by the helical fluid channel 100 of the wheel assembly bushings 84a-c described herein produces reaction forces proportional to the relative acceleration of fluid between the first and second fluid channel ends 102, 104. Hence, the helical fluid channel 100 of the wheel assembly bushings 84a-c described herein act as a mechanical equivalent to an electrical capacitor, using the force-current relationship in an electrical capacitor as an analogy. The phase delay/inertance created by helical fluid channel 100, which forms a fluid-filled inertia track inside the wheel assembly bushings 84a-c, significantly enhances the vibration suppression functionality of the wheel assembly bushings 84a-c described herein. The results of this effect on the wheel assembly 20 is illustrated in FIG. 8.

Figure 8:
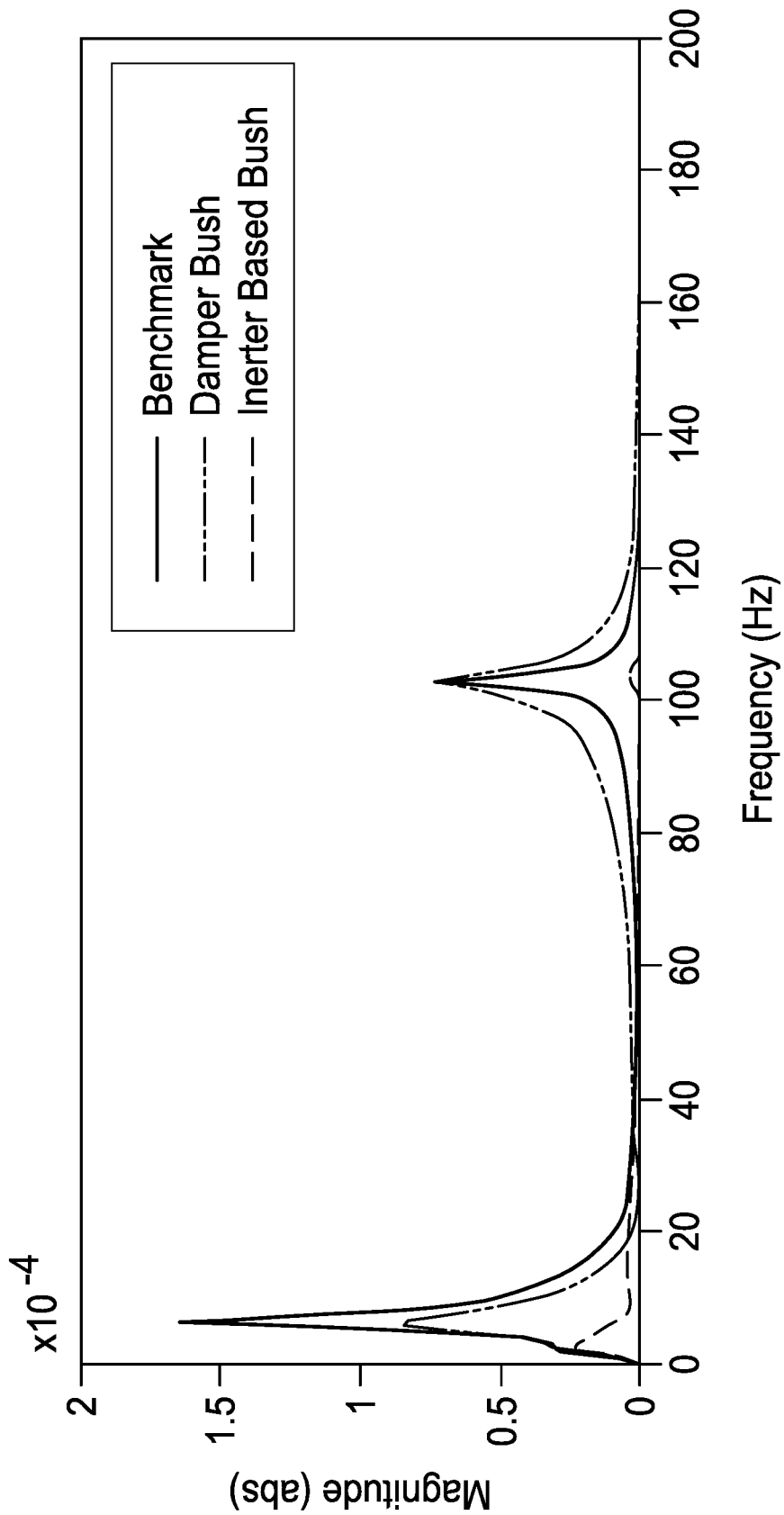
FIG. 8 is a plot illustrating the frequency response of the exemplary wheel assembly shown in FIGS. 1 and 2 and modeled in FIG. 5 to illustrate the improved vibration suppression performance of the exemplary wheel assembly bushings.

FIG. 8 is a plot comparing the frequency domain response of benchmark rubber bushings and the optimized wheel assembly bushings 84a-c described herein to random road inputs. In FIG. 8, the x-axis of the plot is the frequency of the domain response to road inputs, which is measured in Hertz (Hz). The y-axis of the plot is the absolute magnitude of the domain response to road inputs, which is shown on a scale with a $\times 10^{-4}$ multiplier (i.e., where the y-axis values listed are multiplied by $10^{-4}$). For example, the absolute value listed on the y-axis as "2" represents an absolute value of 0.0002. The domain response curve illustrated as a solid line in FIG. 8 provides a benchmark showing the magnitude of the response to road inputs in a wheel assembly 20 where the rotor 52 of the in-wheel electric motor 26 is mounted to the wheel 24 of the vehicle and the stator 50 of the in-wheel electric motor 26 is mounted to the wheel hub 22 with rubber bushings before any optimization has been undertaken. The domain response curve illustrated as a solid line with broken line segments in FIG. 8 shows the magnitude of the response to road inputs in a wheel assembly 20 equipped with rubber bushings between the rotor 52 and the wheel 24 and between the stator 50 and the wheel hub 22, where these rubber bushings have gone through the same optimization process discussed in this patent. The domain response curve illustrated as a dashed line in FIG. 8 shows the magnitude of the response to road inputs in a wheel assembly 20 equipped with the wheel assembly bushings 84a-c described herein.

As FIG. 8 illustrates, the overall magnitude of the system response is reduced extensively in the frequency domain for the wheel assembly 20 equipped with the wheel assembly bushings 84a-c described herein. In particular, the peaks of the system response are drastically reduced at the natural frequencies (at approximately 6.32 and 103 Hz) for the wheel assembly 20 equipped with the wheel assembly bushings 84a-c described herein.

While aspects of the present disclosure have been particularly shown and described with reference to the embodiments above, it will be understood by those skilled in the art that various additional embodiments may be contemplated by the modification of the disclosed inertance-integrated damping system without departing from the spirit and scope of what is disclosed. Such embodiments should be understood to fall within the scope of the present disclosure as determined based upon the claims and any equivalents thereof.

What is claimed is:

1. A wheel assembly, comprising:
   a wheel hub;
   a wheel rotatably mounted on the wheel hub;
   an in-wheel electric motor including a stator mounted on the wheel hub and a rotor coupled to the wheel such that the rotor and wheel rotate together relative to the stator and wheel hub; and
   at least one wheel assembly bushing comprising an inner bushing member, an outer body that is concentrically arranged about and radially spaced from the inner bushing member, and a resilient sleeve positioned radially between the inner bushing member and the outer body,
   wherein the at least one wheel assembly bushing includes a hydraulic chamber positioned within the resilient sleeve and a helical fluid channel extending helically about the inner bushing member between first and second fluid channel ends that are arranged in fluid communication with the hydraulic chamber.

2. The wheel assembly of claim 1, wherein the wheel hub includes a shaft portion and wherein the stator includes an inboard portion that extends annularly about and is supported on the hub portion of the wheel hub and an outboard portion that extends annularly about and is supported on the shaft portion of the wheel hub.

3. The wheel assembly of claim 2, wherein the at least one wheel assembly bushing includes a first wheel assembly bushing that is positioned between the wheel hub and the stator and wherein the hub portion of the wheel hub is received within and abuts the inner bushing member of the first wheel assembly bushing, the outer body of the first wheel assembly bushing is received within and abuts the inboard portion of the stator, and the resilient sleeve of the first wheel assembly bushing is positioned radially between the hub portion of the wheel hub and the inboard portion of the stator.

4. The wheel assembly of claim 2, wherein the at least one wheel assembly bushing includes a second wheel assembly bushing that is positioned between the wheel hub and the stator and wherein the shaft portion of the wheel hub is received within and abuts the inner bushing member of the second wheel assembly bushing, the outer body of the second wheel assembly bushing is received within and abuts the outboard portion of the stator, and the resilient sleeve of the second wheel assembly bushing is positioned radially between the shaft portion of the wheel hub and the outboard portion of the stator.

5. The wheel assembly of claim 1, wherein a plurality of wheel bolts couple the wheel to the rotor and the at least one wheel assembly bushing includes a plurality of third wheel assembly bushings that are positioned between the wheel bolts and the wheel and wherein the wheel bolts are received within and abuts the inner bushing member of the third wheel assembly bushings, the outer body of the third wheel assembly bushings are received within and abut the wheel, and the resilient sleeve of the third wheel assembly bushings are positioned between the wheel bolts and the wheel.

6. The wheel assembly of claim 1, wherein the at least one wheel assembly bushing includes first and second wheel assembly bushings that are positioned radially between the wheel hub and the stator and longitudinally spaced locations.

7. The wheel assembly of claim 1, wherein at least one wheel bolt couples the wheel to the rotor and wherein the at least one wheel assembly bushing includes a first wheel assembly bushing that is positioned between the wheel hub and the stator and a third wheel assembly bushing that is positioned between the wheel and the wheel bolt.

8. The wheel assembly of claim 1, wherein at least one wheel bolt couples the wheel to the rotor and wherein the at least one wheel assembly bushing includes a second wheel assembly bushing that is positioned between the wheel hub and the stator and a third wheel assembly bushing that is positioned between the wheel and the wheel bolt.

9. The wheel assembly of claim 1, wherein at least one wheel bolt couples the wheel to the rotor and wherein the at least one wheel assembly bushing includes first and second wheel assembly bushings that are positioned between the wheel hub and the stator and a third wheel assembly bushing that is positioned between the wheel and the wheel bolt.

10. The wheel assembly of claim 1, wherein the resilient sleeve is made of a resilient material such that the resilient sleeve is configured to permit relative movement between the inner bushing member and the outer body and wherein the helical shape of the helical fluid channel is configured to produce a phase delay between input forces causing relative movement between the inner bushing member and the outer body and reaction forces caused by pressure pulses in the hydraulic chamber resulting from fluid flow through the helical fluid channel.

11. The wheel assembly of claim 1, wherein the helical fluid channel is configured as an inertia-track where fluid flow through the helical fluid channel produces inertance within the at least one wheel assembly bushing that operates to reduce magnetic gap deformation between the stator and the rotor of the in-wheel electric motor.

12. A wheel assembly for a vehicle, the wheel assembly comprising:
a wheel hub;
a wheel rotatably mounted on the wheel hub;
an in-wheel electric motor including a stator mounted on the wheel hub and a rotor coupled to the wheel such that the rotor and wheel rotate together relative to the stator and wheel hub; and
at least one wheel assembly bushing comprising an inner bushing member, an outer body that is concentrically arranged about and radially spaced from the inner bushing member, and a resilient sleeve positioned radially between the inner bushing member and the outer body,
wherein the resilient sleeve is made of a resilient material such that the resilient sleeve is configured to permit relative movement between the inner bushing member and the outer body,
wherein the at least one wheel assembly bushing includes a hydraulic chamber positioned within the resilient sleeve and a helical fluid channel extending helically about the inner bushing member, the helical fluid channel being arranged in fluid communication with the hydraulic chamber such that the helical fluid channel is configured to produce a phase delay between input forces causing relative movement between the inner bushing member and the outer body and reaction forces caused by pressure pulses in the hydraulic chamber resulting from fluid flow through the helical fluid channel.

13. The wheel assembly of claim 12, wherein the at least one wheel assembly bushing is positioned between the wheel hub and the stator.

14. The wheel assembly of claim 12, wherein at least one wheel bolt couples the wheel to the rotor and the at least one wheel assembly bushing is positioned between the at least one wheel bolt and the wheel.

15. The wheel assembly of claim 12, wherein the at least one wheel assembly bushing includes a divider body within the resilient sleeve that extends into the hydraulic chamber to divide the hydraulic chamber into first and second hydraulic chamber segments and a fluid passageway that permits fluid flow between the first and second hydraulic chamber segments.

16. The wheel assembly of claim 12, further comprising:
a brake caliper fixed to at least one of the wheel hub and the stator; and
a brake disc fixed to the rotor such that the brake disc and rotor rotate together relative to the brake caliper.

* * * * *